United States Patent [19]

Ramsay et al.

[11] Patent Number: 4,756,600

[45] Date of Patent: Jul. 12, 1988

[54] PLASTICS PACKAGED OPTICAL FIBRES

[75] Inventors: Melvin M. Ramsay, London; Mahesh K. R. Vyas, Harlow; Stuart R. Barnes, Woodford Green, all of England

[73] Assignee: STC PLC, London, England

[21] Appl. No.: 885,424

[22] Filed: Jul. 14, 1986

[30] Foreign Application Priority Data

Jul. 24, 1985 [GB] United Kingdom ............... 8518683

[51] Int. Cl.[4] .............................................. G02B 6/10
[52] U.S. Cl. ............................. 350/96.30; 350/96.29; 350/96.34
[58] Field of Search ............... 350/96.29, 96.23, 96.30, 350/96.34

[56] References Cited

U.S. PATENT DOCUMENTS 4,288,145 9/1981 Takeuchi et al. ............... 350/96.34
4,642,265 2/1987 Suzuki .............................. 350/96.34
4,702,554 10/1987 Takahashi et al. .............. 350/96.34

FOREIGN PATENT DOCUMENTS 2038021 7/1980 United Kingdom .
2046625 11/1980 United Kingdom .
2078996 1/1982 United Kingdom .
2086607 5/1982 United Kingdom .
2096353 10/1982 United Kingdom .

OTHER PUBLICATIONS

'Optical-Fiber Packaging and its Influence on Fiber Straightness and Loss' by D. Gloge, Bell Syst. Tech. J., vol. 54, No. 2, pp. 245–262 (Feb. 1985).
'Processing and Characterisation of Tight Nylon Secondary Coatings for Optical Fibres' by S. R. Barnes et al., Plastics in Telecommunications III Conference, London, Sep. 1982 (Conference Publication, pp. 15-2 to 15-12).

Primary Examiner—William L. Sikes
Assistant Examiner—Akm E. Ullah
Attorney, Agent, or Firm—Lee, Smith & Zickert

[57] ABSTRACT

A design of plastics packaged glass optical fibre in which the plastics packaging consists of a urethane acrylate primary coating, a silicone rubber secondary coating and a nylon tertiary coating, the three coatings coacting to provide a pair of substantially decoupled mechanical filters.

10 Claims, 6 Drawing Sheets

PLASTICS PACKAGED OPTICAL FIBRES

BACKGROUND OF THE INVENTION

This invention relates to the plastics packaging of glass optical fibres.

It is conventional practice to protect the surface of freshly drawn glass optical fibre with one or more plastics coatings. Such coatings are useful in protecting the glass surface from degradation by atmospheric attack, and also serve to provide protection from mechanical damage and to give additional strength for the package. On the other hand they are also liable to introduce problems associated with the inducing of microbending losses. An analysis of microbending loss problems in relation to optical fibres provided with single coatings and with double coatings is given in the paper entitled 'Optical-Fiber Packaging and Its Influence on Fiber Straightness and Loss' by D. Gloge appearing in the Bell System Technical Journal, Vol. 54, No. 2 pp 245–262 (February 1975). The analysis of that paper indicates that a double coating consisting of a high modulus layer and a low modulus layer affords much better protection for a fibre than a single layer of either high or low modulus. Following from this, a conventional construction of plastics packaged fibre consists of a primary coating of a relatively low modulus material, such as a silicone rubber, enveloped in a secondary coating of a relatively high modulus material such as nylon. The application of such coatings to silica fibres designed for operation at a wavelength range in the region of 1.5 microns has produced fibres that can be satisfactorily cabled in a 'tight' construction without introducing excessive microbending loss. In single mode fibre this microbending loss is revealed as a narrowing of the spectral transmission window of the fibre from its long wavelength end. This narrowing results from the fact that the loss induced by microbending is most severe for the most weakly guided light, that is the light of longest wavelength. For this reason the microbending loss effect is also sometimes known as the bend edge effect.

Subsequent to the development of the use of silicone rubbers for primary plastics coating optical fibres, it has been found that improved strength of primary coated fibre, in terms of fibre yield at a given proof strain, have been generally achieved when a urethane acrylate coating is substituted for the silicone rubber. However, when a urethane acrylate primary coated fibre is provided with a nylon secondary coating a significant bend edge effect is liable to occur with the application of the secondary coating or upon cabling. This finding is consistent with the Gloge's analysis, for the substitution of the urethane acrylate for the silicone rubber has resulted in changing the structure from a 'hard-on-soft' (hard shell) package to a 'hard-on-hard' package.

United Kingdom Patent Specification No. 2096353A describes an optical fibre that is plastics packaged with a triple plastics coating. The primary coating is a high modulus material in the range 200 to 400 kg/mm$^2$ (c. 2.0 to 4.0 GPa), and is exemplified by a thermosetting resin, 200 microns thick, having a modulus of 200 kg/mm$^2$. A phenolic resin is suggested as an alternative material. The secondary coating is a low modulus material in the range 0.2 to 0.9 kg/mm$^2$ (c. 2.0 to 9.0 MPa), and is exemplified by a silicone rubber. This layer is 150 microns thick, and has a modulus of 0.35 kg/mm$^2$. An acrylonitrile rubber is suggested as an alternative material. The tertiary coating is a high modulus material in the range 40 to 300 kg/mm$^2$ (c. 400 to 3000 MPa), and is exemplified by nylon, 200 microns thick, having a modulus of 150 kg/mm$^2$. Polytetrafluorethylene is suggested as an alternative material. The burden of the teaching accompanying the specific description is that the use of a particularly high modulus and relatively thick primary coating is required to stiffen the fibre so as to protect it from longitudinal compression produced by differential thermal expansion effects involving the tertiary coating.

We have found that these differential expansion induced longitudinal compression effects are not as significant as suggested, provided that effective use is made of the teaching regarding control of crystallinity in the extrusion of the nylon that is contained in the paper by S. R. Barnes et al entitled 'Processing and Characterisation of Tight Nylon Secondary Coatings for Optical Fibres' given at the 'Plastics in Telecommunications III' Conference, London, September, 1982, (Conference publication pages 15-1 to 15-12). Furthermore, we have found that, though a switch from a silicone rubber primary coating to one of a typical urethane acrylate, thereby increasing the modulus (tensile modulus at 2.5% strain) from the range of about 2.0–6.0 MPa to a few hundreds of megapascals, affords a useful increase in fibre strength; a further increase in modulus of the primary coating to about 1 GPa, afforded by using a high strength acrylate, through it may produce a further improvement in fibre strength, this is accompanied by a significant deterioration in optical properties of the fibre compared with those achieved with the lower modulus urethane acrylate. There is reason to believe that the use of a still higher modulus primary coating in the range 200 to 400 kg/mm$^2$ suggested in GB No. 2096353A will produce a further deterioration in optical properties.

SUMMARY OF THE INVENTION

According to the present invention there is provided a plastics packaged glass optical fibre which contains its optical waveguiding structure within the glass, wherein the plastics packaging consists of primary, secondary and tertiary coating layers of relatively high, relatively low and relatively high modulus respectively, wherein the primary coating layer is a UV curable resin having a modulus in the range 5 to 100 MPa and a thickness of at least 30 microns, wherein the secondary coating layer has a modulus at least two orders of magnitude smaller than that of the primary coating, and a thickness of at least 50 microns, and wherein the tertiary coating has a modulus in the range 400 to 3000 MPa and a thickness of at least 40 microns.

Typically the material of the first coating is a urethane acrylate, that of the second a silicone rubber, and that of the third a nylon or a polyester elastomer.

BRIEF DESCRIPTION OF THE DRAWINGS

There follows a description of a plastics packaged glass optical fibre embodying the invention in a preferred form. The description refers to the accompanying drawings in which.

DETAILED DESCRIPTION OF A PREFERRED EMBODIMENT

Figure 1:
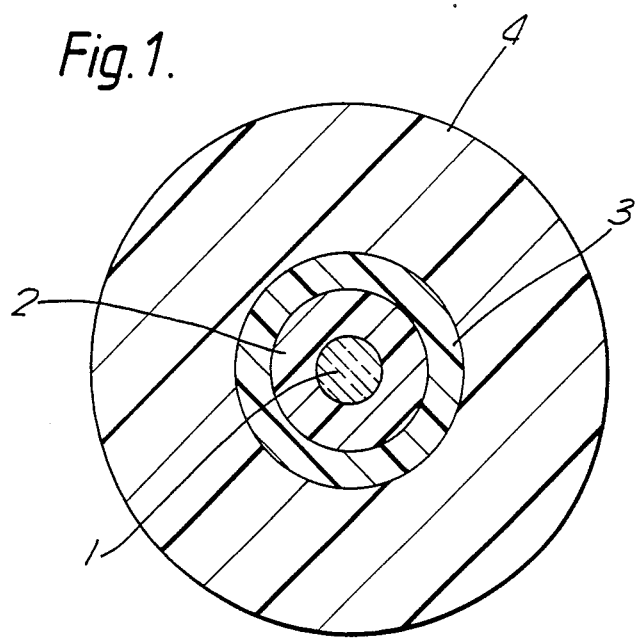
FIG. 1 is a schematic representation of a cross section of the packaged fibre.

Referring now particularly to FIG. 1, a single mode silica optical fibre that contains its waveguiding structure within the glass, and is designed for operation at wavelengths in the region of 1.55 microns, is represented at 1. This fibre has a mode field diameter of $10 \pm 1.0$ microns, and an external diameter of 125 microns. It is drawn from a preform of much larger cross section, and, on-line with the drawing operation, the freshly drawn surface is provided with a plastics primary coating 2 to protect it from mechanical damage and degradation by atmospheric attack. The material of this primary coating is an ultra-violet light curing urethane acrylic material marketed by Lankro under the designation RCP 2280B. This is applied by pressurised dip coating, immediately after which it is cured with UV light. The coating thickness is such as to provide the primary coated fibre with an overall diameter of 250 microns.

Alternative materials that could have been used in place of the Lankro material include for instance the urethane acrylate marketed by De Soto under the designation De Soto 131 or that marketed under the designation Borden LUV.

Figure 2:
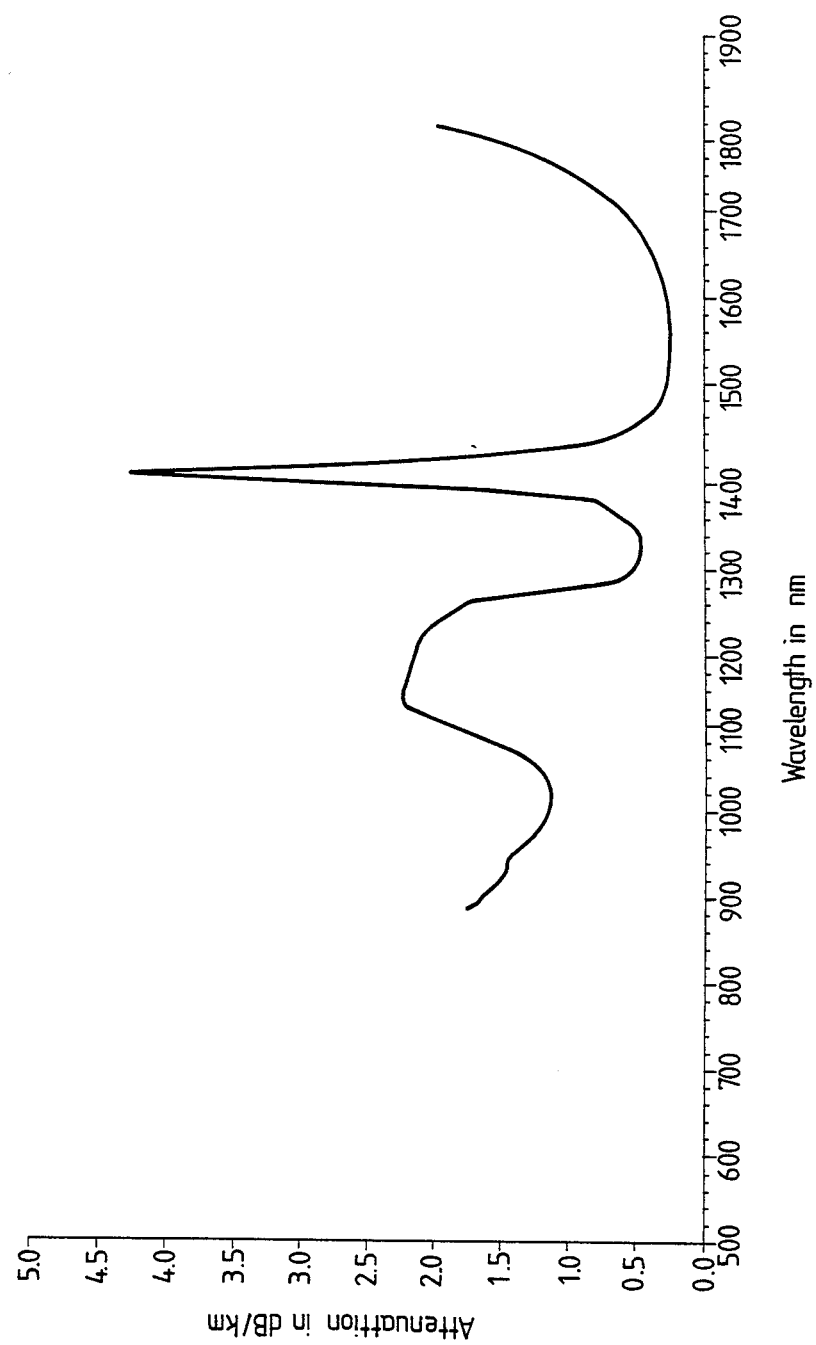
FIG. 2 depicts the spectral characteristic of the fibre after it has received its primary plastics coating.

The drawn fibre is taken up as a single layer winding, without any overlapping turns, on a smooth surfaced plastics faced metal drum approximately 30 cm in diameter. The spectral characteristic of FIG. 2 was made with the fibre wound on this drum. The region of interest is the spectral window on the long wavelength side of the OH absorption peak in the neighbourhood of 1400 nm. In particular it is seen that the bottom of the trough occurs at about 1550 nm, and that the attenuation has increased by approximately 0.25 dB/km when the wavelength is shifted out to 1680 dB/km.

The primary coated fibre is paid off from the drum on which it was originally wound and is fed through a tandem arrangement of applicators for applying the secondary and tertiary plastics coatings 3 and 4 respectively. The material of the secondary coating is a silicone rubber marketed by Shinetsu under the designation OF 162. This is also applied by pressurised dip coating. The application of this secondary coating takes the diameter of the packaged fibre up to 375 microns. In place of the UV cured silicone of the secondary coating, a thermally curing silicone resin could for instance have been used such as SYLGARD 182. Then the fibre passes through a cross head extruder for the application of the tertiary coating, which is of nylon 12, to provide the package with an overall diameter of 850 microns. On leaving the extruder the nylon extrudate is air-cooled in a controlled manner to regulate the amount of radial compression in accordance with the teachings set out in the paper by S. R. Barnes et al to which previous reference has been made. In place of the nylon of the tertiary coating, a polyester elastomer could for instance have been used such as the material marketed by DuPont under the designation HYTREL 4046.

The modulus of the primary coating is about 200 MPa, that of the secondary coating is at least two orders of magnitude smaller, and that of the tertiary coating is about 800 MPa. The thicknesses of the layers are such that the primary and secondary coatings co-act to provide a first mechanical filter for the fibre while the secondary and tertiary coatings co-act to provide a second mechanical filter. The thickness of the secondary coating is great enough to provide significant decoupling of these two filters.

The primary coating needs to be at least 30 microns thick because below this value strong primary coated fibre is not reliably obtained. The secondary coating should be at least 50 microns thick in order to achieve adequate decoupling of the mechanical filters. For many applications it is desirable for the secondary coating to be not greater than 200 microns thick because, as the layer thickness is increased beyond this point, so the impairment of optical performance at low temperatures becomes increasingly pronounced. The tertiary coating needs to be at least 40 microns in thickness to be effective, and typically, if applied by extrusion, will be over 100 microns thick.

Figure 3:
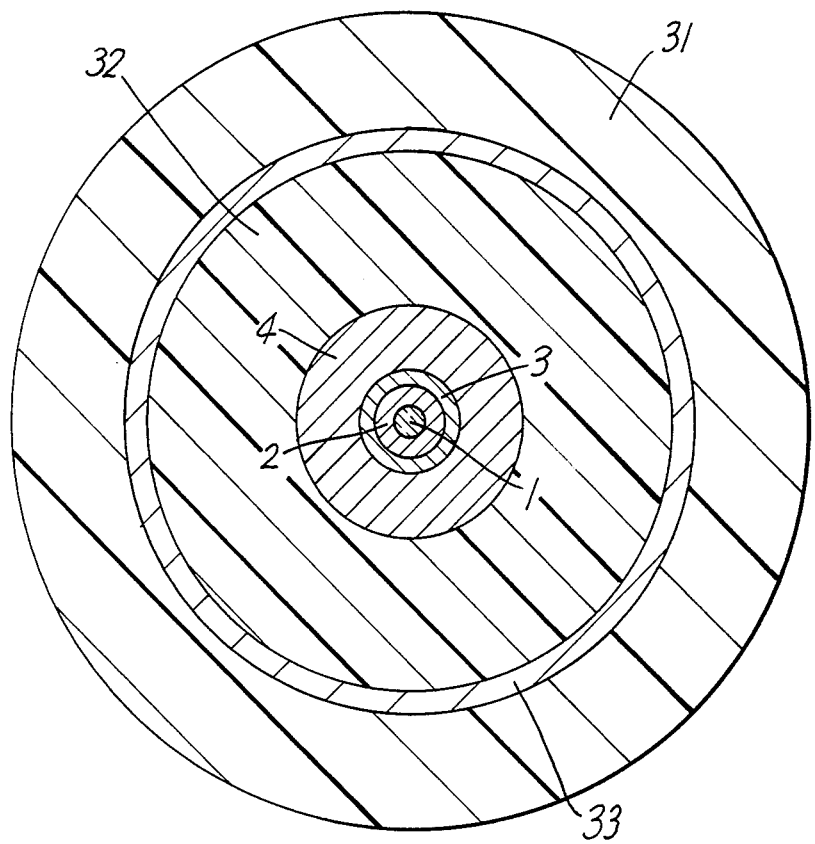
FIG. 3 is a schematic representation of a cross-section of a cable incorporating the packaged fibre of FIG. 1.
Figure 4:
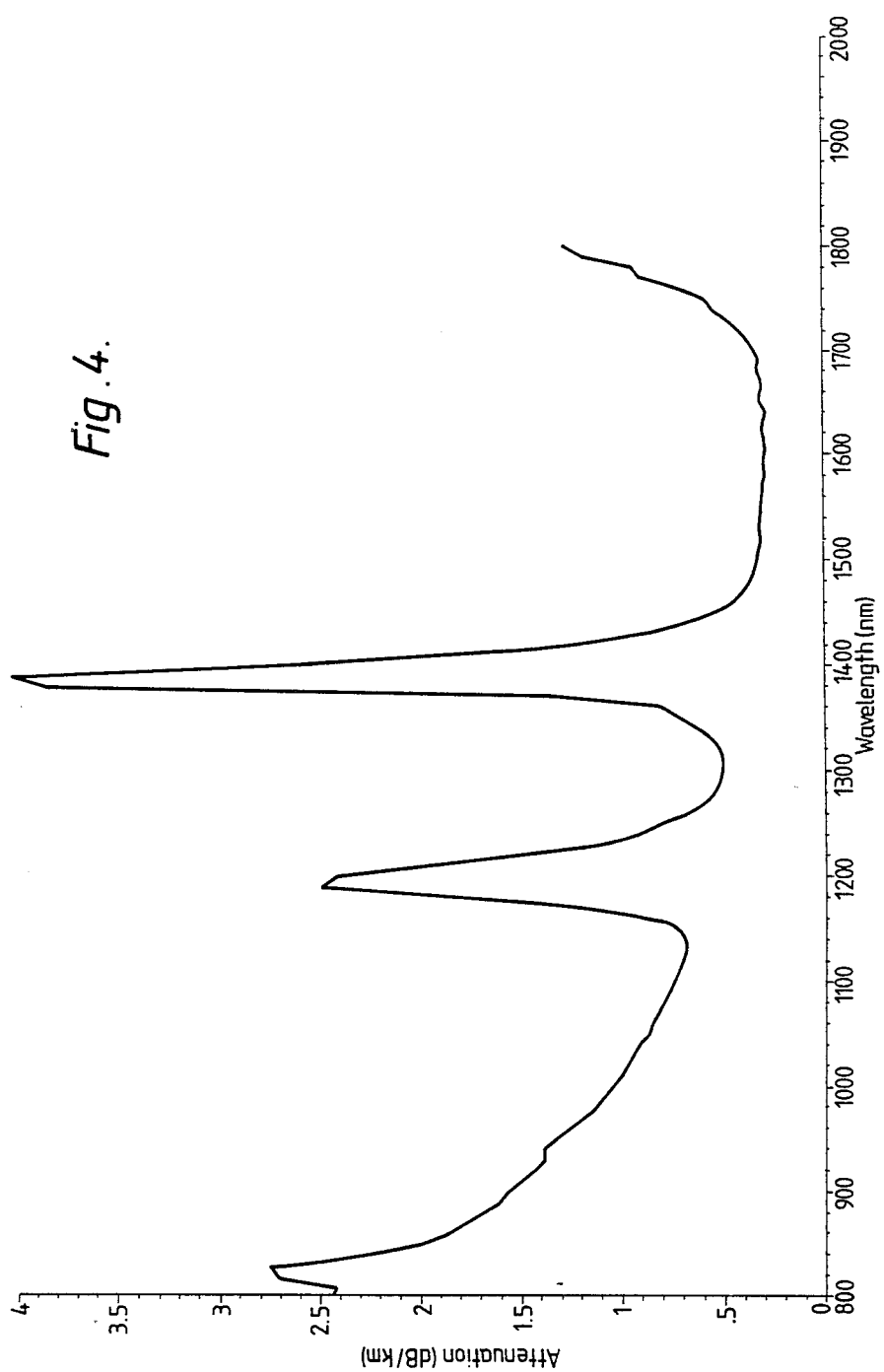
FIG. 4 depicts the spectral characteristic of the fibre after it has received all three plastics coatings and has been cabled.

Referring now to FIG. 3, the resulting plastics packaged fibre 1, complete with primary, secondary and tertiary coatings 2, 3 and 4, was incorporated into a design of single optical fibre cable in which the packaged fibre is enclosed in extruded cable sheath 31 of polyester elastomer, marketed by Du Pont under the designation HYTREL 7246, together with a cable strength member 32 comprising 16 yarns of 1580 dTex aramid fibre marketed by Du Pont under the designation KEVLAR 49. The aramid fibre yarns are arranged around the packaged fibre in two layers to a diameter of about 2 mm. These layers are held in place by means of a polyester wrap 33 for the application of the sheath 31 which has an o.d. of 3 mm. The spectral characteric of the packaged fibre after cabling is depicted in FIG. 4. Comparing the spectral windows on the long wavelength side of the OH absorption peak in the neighbourhood of 1400 nm, it is seen that the cabled fibre exhibits slightly better long wave performance than when it was on the drum after having received its primary coating. In the case of the cabled fibre the attenuation has not increased by 0.25 dB/km from its value in the trough until the wavelength of about 1740 nm, whereas for the primary coated fibre on its winding drum the corresponding point occurs at a wavelength of about 1680 nm.

Considerable differences exist between the two characteristics on the short wavelength side of the 1300 nm spectral window. These differences are attributable to the effects of the cutting-on of the next higher order mode. In the region of cut-on optical guidance is very weak, and hence attenuation particularly susceptible to changes in radius of curvature along the length of the fibre. In consequence small changes in positioning of the fibre or cable while making measurements will radically alter the spectral characteristic in the region.

Nothing of significance concerning the properties of the fibre or cable as a single mode fibre should therefore be deduced from a comparison of a single pair of spectral characteristics in this spectral region where additional modes are beginning to cut-on.

Figure 5:
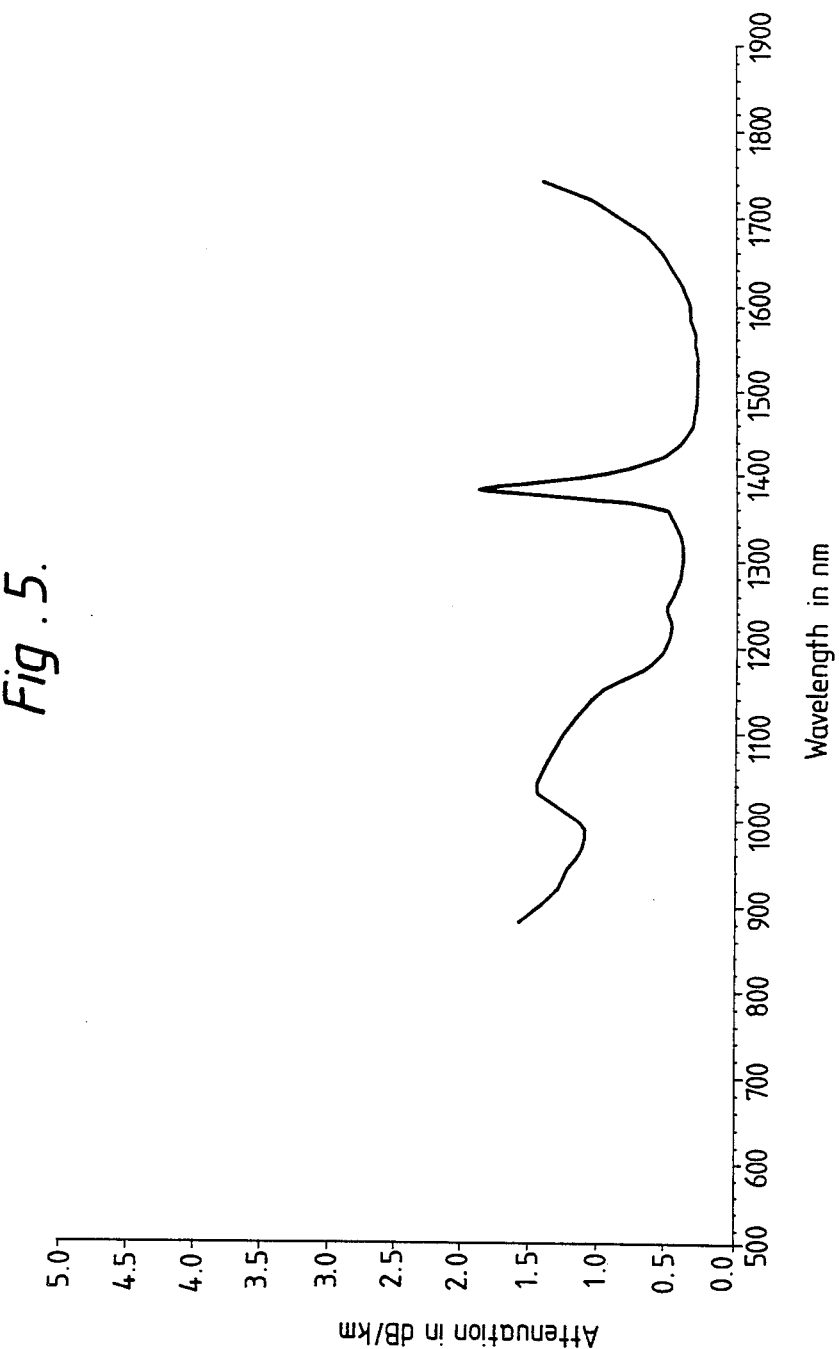
FIG. 5 depicts the spectral characteristic of a similar optical fibre after it has received its primary coating, but in this instance a coating not according to the present invention.
Figure 6:
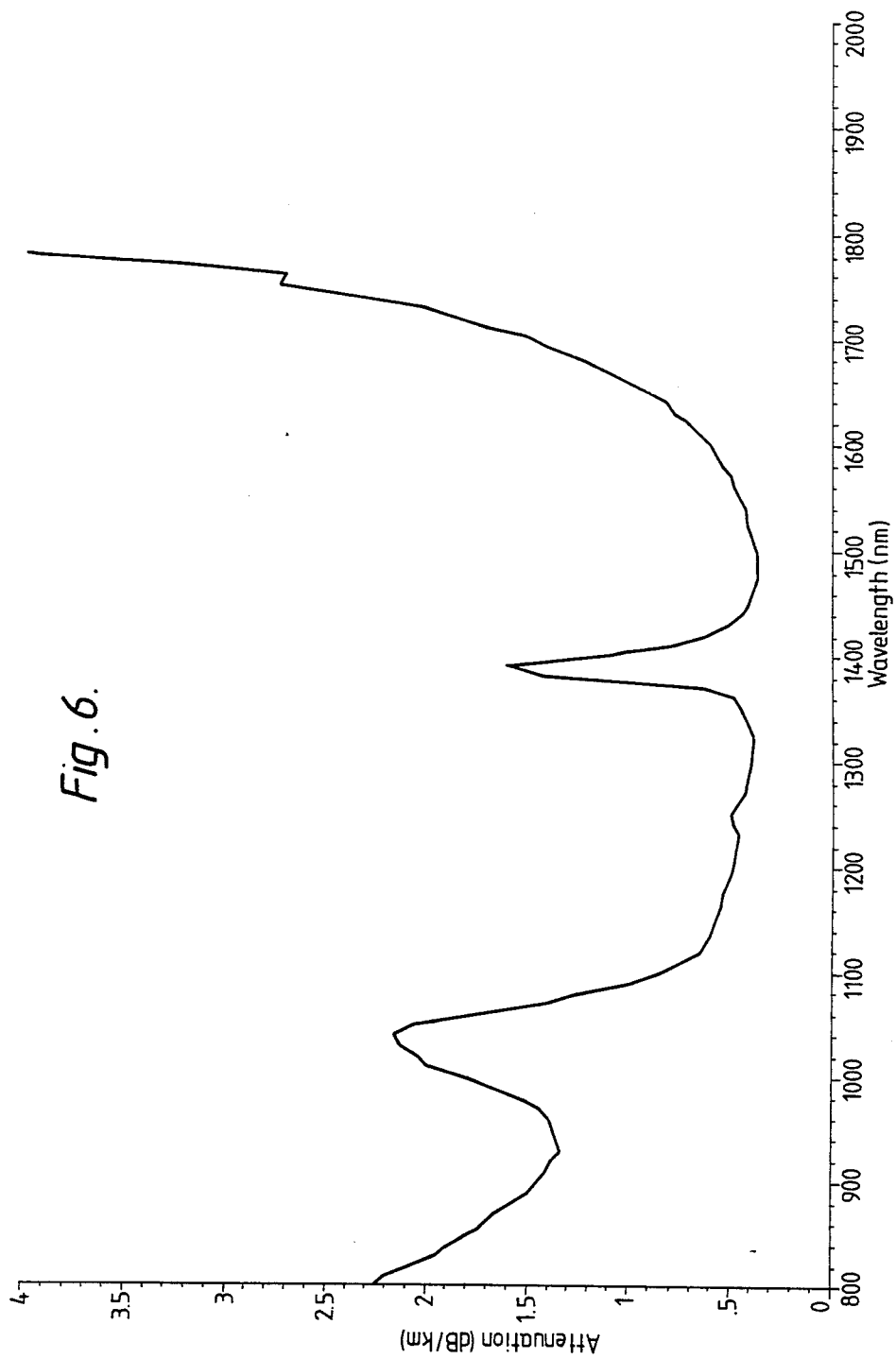
FIG. 6 depicts the spectral characteristic of the fibre of FIG. 4 after it has received its secondary and tertiary plastics coatings and has been cabled in the same manner as the cabling employed in respect of the cable of FIG. 3.

For purposes of comparison, measurements were made of the spectral characteristics of a similar fibre provided with a triple plastics coating that does not fulfil the criteria of the present invention, but instead incorporates an acrylate coating between a conventional low modulus inner coating and high modulus outer coating of a 2-layer plastics coated fibre. In this instance the primary coating was a 62.5 micron thickness layer of a low modulus silicone rubber that is marketed by Dow Corning under the designation SYLGARD 182. The secondary coating was a 62.5 micron thickness layer of a high strength acrylate having a modulus of about 1 GPa that is marketed by DeSoto under the designation 950X101. The tertiary coating was a nylon 12 coating identical with that of the fibre described previously with reference to FIG. 1. FIG. 5 depicts the spectral characteristic of the silicone rubber primary coated fibre wound upon its winding drum. In the region of interest to the long wavelength side of the OH absorption peak in the neighbourhood of 1400 nm this characteristic is seen to be very similar to that of FIG. 2, though the window is slightly narrow. (The differences to the short wavelength side of the peak are similarly attributed to the effects of the cutting on of higher order modes, and hence are similarly not relevant to the provision of plastics packaging). FIG. 6 depicts the spectral characteristic of the packaged fibre after it has received its secondary and tertiary coatings, and has been cabled after the manner employed to cable the packaged fibre of FIG. 1. It is immediately evident that the cabling has resulted in a significant narrowing of the window, with the result that the attenuation has already increased by approximately 0.01 dB on moving from the wavelength minimum out only as far as 1550 nm.

Apart from the advantage of achieving a high strength fibre by employing a urethane acrylate primary coating, we have found that there is the added advantage that the rate of evolution of hydrogen by this material is significantly lower than that of the other plastics materials mentioned. It is desirable to protect optical fibres as far as possible from hydrogen because if they absorb hydrogen their optical attenuation is adversely affected.

Figure 7:
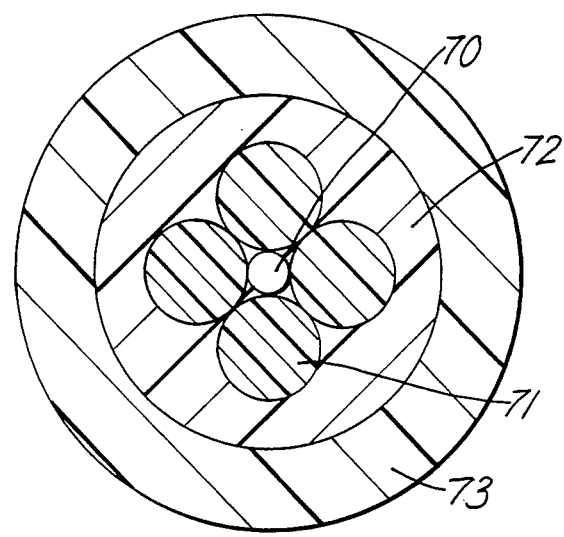
FIG. 7 is a schematic representation of a cross-section of a quad cable at least two of whose four elements are constituted by packaged fibres of FIG. 1.

It should be understood that, though the foregoing discussion has related exclusively to the use of the packaged fibre in cable constructions containing only a single fibre, the packaged fibre is also suitable for use in cable designs incorporating more than one optical fibre in the cable sheath such as the cable of FIG. 7. This cable consists of a quad of four elements 70, at least two of which are plastics packaged fibres. These four elements 70 are arranged round a central member 71, are surrounded with a layer of aramid fibre yarns, and are encased in a polyester elastomer sheath 73.

We claim:

1. A plastics packaged glass optical fibre which contains an optical waveguiding structure within the glass, wherein the plastics packaging consists of primary, secondary and tertiary coating layers of relatively high, relatively low and relatively high modulus respectively, wherein the primary coating layer is a UV curable resin having a modulus in the range 5 to a few hundred MPa and a thickness of at least 30 microns, wherein the secondary coating layer has a modulus at least two orders of magnitude smaller than that of the primary coating, and a thickness of at least 50 microns, and wherein the tertiary coating has a modulus in the range 400 to 3000 MPa and a thickness of at least 40 microns.

2. A plastics packaged glass optical fibre as claimed in claim 1, wherein the material of the secondary coating is a silicone rubber.

3. A plastics packaged glass optical fibre as claimed in claim 2, wherein the material of the secondary coating is a UV curing silicone rubber.

4. A plastics packaged glass optical fibre as claimed in claim 3, wherein the material of the tertiary coating is a nylon.

5. A plastics packaged glass optical fibre as claimed in claim 3, wherein the material of the tertiary coating is a polyester elastomer.

6. A plastics packaged glass optical fibre as claimed in claim 3, wherein the material of the primary coating is a urethane acrylate.

7. A plastics packaged glass optical fibre as claimed in claim 3, wherein the secondary coating has a thickness not exceeding 200 microns.

8. An optical fibre cable incorporating at least one plastics packaged optical fibre which contains an optical waveguiding structure within the glass, wherein the plastics packaging consists of primary, secondary and tertiary coating layers of relatively high, relatively low and relatively high modulus respectively, wherein the primary coating layer is a UV curable resign having a modulus in the range 5 to a few hundred MPa and a thickness of at least 30 microns, wherein the secondary coating layer has a modulus at least two orders of magnitude smaller than that of the primary coating, and a thickness of at least 50 microns, and wherein the tertiary coating has a modulus in the range 400 to 3000 MPa and a thickness of at least 40 microns.

9. A cable as claimed in claim 8, wherein the material of the secondary coating of each plastics packaged fibre of the cable is a silicone rubber.

10. A cable as claimed in claim 8, wherein the material of the secondary coating of the or each plastics packaged fibre of the cable is a UV curing silicone rubber.

* * * * *